US009360052B2

(12) United States Patent
Culver et al.

(10) Patent No.: US 9,360,052 B2
(45) Date of Patent: Jun. 7, 2016

(54) SHAFT COLLAR

(71) Applicant: Innovation First, Inc., Greenville, TX (US)

(72) Inventors: Bryan J. Culver, Greenville, TX (US); David Anthony Norman, Greenville, TX (US); Robert H. Mimlitch, III, Rowlett, TX (US); Paul David Copioli, Rockwall, TX (US); Aren Calder Hill, Rowlett, TX (US); John Edward Vielkind-Neun, Greensville, TX (US); Arthur Philip Dutra, V, Greenville, TX (US)

(73) Assignee: Innovation First, Inc., Greenville, TX (US)

( * ) Notice: Subject to any disclaimer, the term of this patent is extended or adjusted under 35 U.S.C. 154(b) by 363 days.

(21) Appl. No.: 14/171,853

(22) Filed: Feb. 4, 2014

(65) Prior Publication Data

US 2015/0219164 A1 Aug. 6, 2015

(51) Int. Cl.
*F16D 1/08* (2006.01)
*F16F 15/08* (2006.01)

(52) U.S. Cl.
CPC ............... *F16D 1/0864* (2013.01); *F16F 15/08* (2013.01); *Y10T 403/10* (2015.01); *Y10T 403/35* (2015.01); *Y10T 403/69* (2015.01)

(58) Field of Classification Search
CPC ............... Y10T 403/10; Y10T 403/35; Y10T 403/4648; Y10T 403/4682; Y10T 403/4668; Y10T 403/4688; F16F 15/08; F16F 1/3605; F16F 1/36; F16F 1/3732; F16F 7/00; F16F 3/0873; F16F 3/093; F16D 1/0864
USPC ...................... 403/1, 345, 265, 266, 267, 261
See application file for complete search history.

(56) References Cited

U.S. PATENT DOCUMENTS

| 1,409,758 | A | * | 3/1922 | Nichols ..................... B27B 5/32 |
| | | | | 285/207 |
| 2,967,070 | A | * | 1/1961 | Walton ...................... F16D 1/09 |
| | | | | 403/247 |
| 3,838,896 | A | | 10/1974 | Kawamura et al. |
| 4,767,108 | A | | 8/1988 | Tanaka et al. |
| 4,893,799 | A | | 1/1990 | de Fontenay |
| 5,348,282 | A | | 9/1994 | Choi et al. |
| 5,383,728 | A | | 1/1995 | Micca et al. |
| 5,733,015 | A | * | 3/1998 | Demarest ............... A63C 17/24 |
| | | | | 152/312 |
| 6,227,622 | B1 | * | 5/2001 | Roderick ............. A63C 17/223 |
| | | | | 152/323 |
| 6,325,194 | B1 | | 12/2001 | Thomire |
| 6,513,801 | B1 | * | 2/2003 | McCarthy .......... B60G 21/0551 |
| | | | | 267/141.1 |
| 6,543,791 | B1 | * | 4/2003 | Lee ........................ A63C 17/06 |
| | | | | 152/47 |
| 6,786,644 | B2 | | 9/2004 | Vignotto et al. |

(Continued)

*Primary Examiner* — Joshua J Michener
*Assistant Examiner* — Matthew Gitlin
(74) *Attorney, Agent, or Firm* — Adam K. Sacharoff; Much Shelist

(57) ABSTRACT

In one embodiment there is provided a shaft collar having a two component structure defined by a first component having a central bore for receipt of a shaft or axle and a second component positioned partially within the first component. The second component also having a relatively harder stiffness than the first component. The second component further includes a pair of opposing ribs positioned within the first component and about the central bore and a pair of C-shaped caps separately positioned against upper and lower ends of the pair of ribs and wherein the pair of opposing ribs have a height such that the at least a portion of the pair of C-shaped caps protrude from the upper and lower faces of the first component.

28 Claims, 5 Drawing Sheets

(56) References Cited

U.S. PATENT DOCUMENTS

| | | | |
|---|---|---|---|
| 6,854,194 B2* | 2/2005 | Hansen | G01M 1/045 |
| | | | 116/208 |
| 7,040,553 B2 | 5/2006 | Clark | |
| 7,478,803 B2* | 1/2009 | Lee | A63C 17/06 |
| | | | 267/141 |
| 7,506,862 B2* | 3/2009 | Siemer | B60G 7/02 |
| | | | 267/141 |
| 8,141,913 B2 | 3/2012 | Kern-Emmerich et al. | |
| 8,528,180 B2* | 9/2013 | Sun | F16F 15/14 |
| | | | 29/407.07 |
| 2003/0094125 A1* | 5/2003 | Hsueh | B65G 39/07 |
| | | | 116/208 |
| 2003/0230866 A1* | 12/2003 | Lee | A63C 17/06 |
| | | | 280/124.165 |
| 2012/0267455 A1 | 10/2012 | Hansen | |
| 2014/0162795 A1* | 6/2014 | Hewitt | F16D 3/78 |
| | | | 464/88 |

* cited by examiner

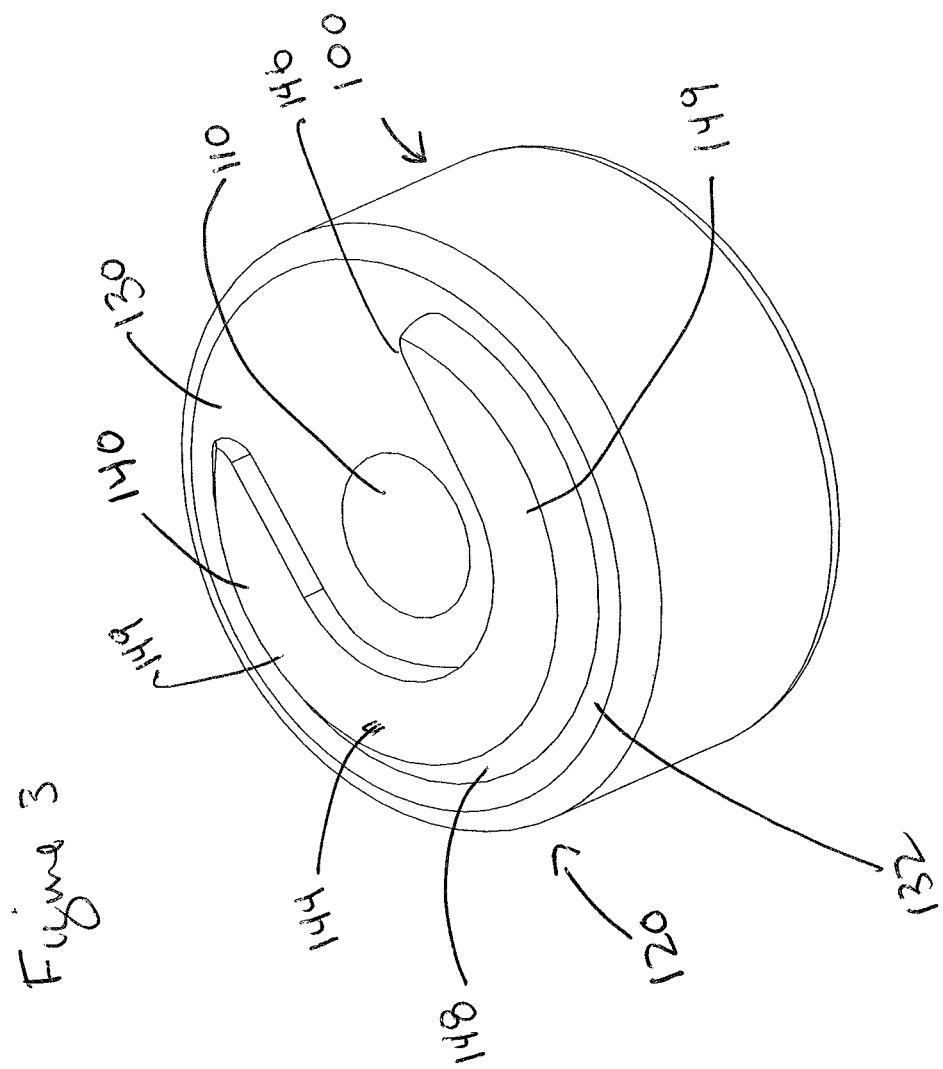

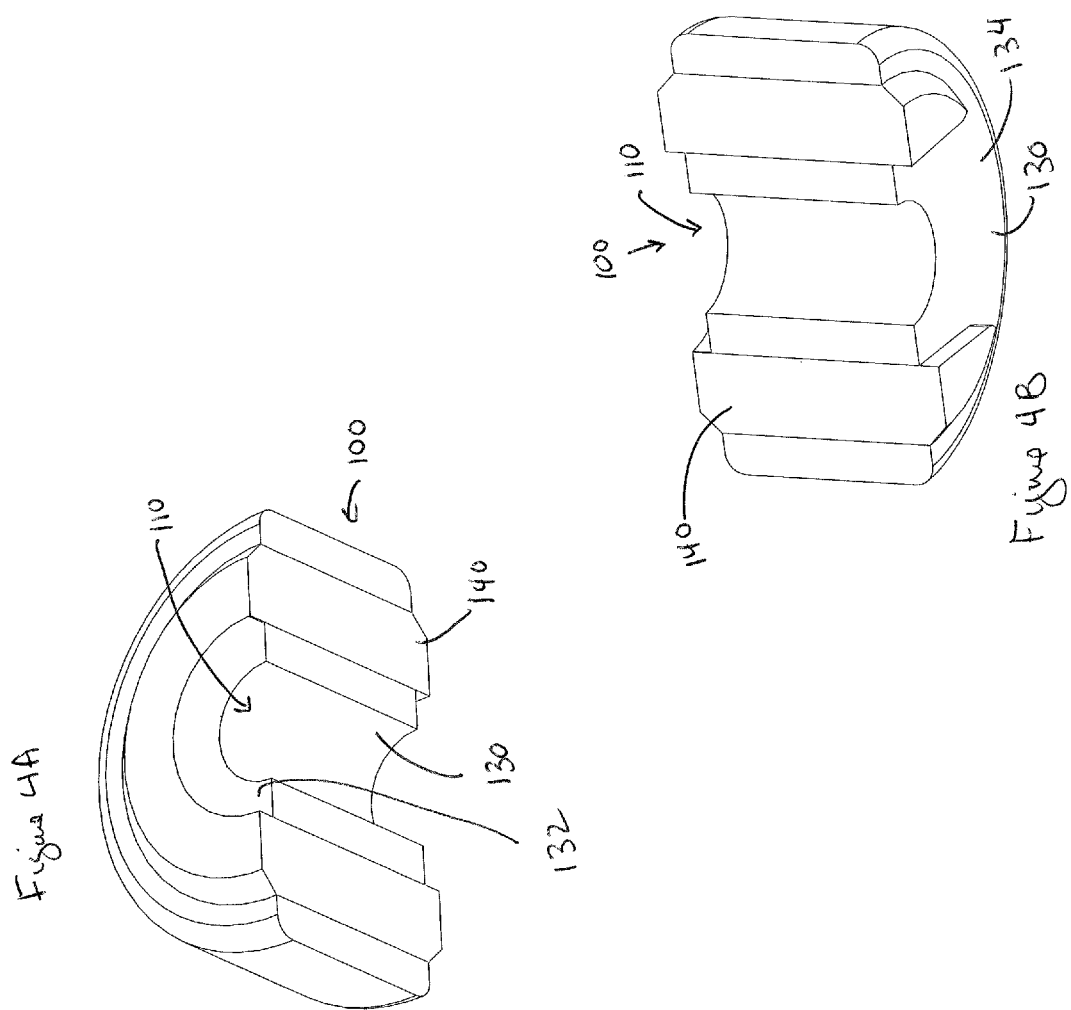

SHAFT COLLAR

FIELD OF THE INVENTION

The present invention relates to a shaft collar.

BACKGROUND OF THE INVENTION

A shaft collar is a simple machine component found in many machines and applications. A Shaft collar is used as mechanical stops, locating components, and bearing faces. The simple design lends itself to easy installation. There are virtually only a few types of shaft collars, one of the more popular type is a set screw style. The set screw style typically employ a solid ring with a square-head set screw that screw into a bore on a side of the shaft collar with the point of the screw being capable of being tightened against the axle or shaft that is inserted through the shaft collar. The type of screw may be of any kind, hex screw, Allen screw, etc. A second type of shaft collar is a clamping style collar and may come in one or two piece designs. Instead of having a screw protrude into a shaft, the screw act to compress the collar and lock it into place.

While these types of shaft collars work well in the industry and for their particular trade, the main problem with these shaft collars is that they require the user to handle a tool in order to secure the shaft collar in place. When used in toys or for young children the dexterity required to tighten a tiny screw on a shaft collar is virtually impossible without an adult or teenager. Therefore there is need for a shaft collar that can be easily used by a child when building mechanical toys.

SUMMARY OF THE INVENTION

In one embodiment of the present invention there is provided a shaft collar having a two component structure defined by a first component having a central bore for receipt of a shaft or axle and a second component positioned partially within the first component. The second component having a higher stiffness than the first component. In addition, the second component includes a pair of opposing ribs positioned within the first component and about the central bore, and includes a pair of C-shaped caps separately positioned against upper and lower ends of the pair of ribs. The pair of opposing ribs have a height such that the at least a portion of the pair of C-shaped caps protrude from the upper and lower faces of the first component.

In other aspects of the present invention, the first component may be made from a resilient elastomeric material and the second component may be made from a plastic material. In addition, the C-shaped caps may be orientated such that one open end from one of the caps faces the open end of the other cap; the ribs may be arcuate shaped; and/or the C-shaped caps may be orientated such that the ribs are positioned over legs of the C-shaped caps.

In other aspects, the shaft collar may be formed by co-molding the two components.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 3 is a perspective view of a shaft collar designed in accordance with an embodiment of the present invention;

FIGS. 4A and 4B are cross sectional views of the shaft collar from FIG. 3.

DETAILED DESCRIPTION OF THE DRAWINGS

Figure 1:
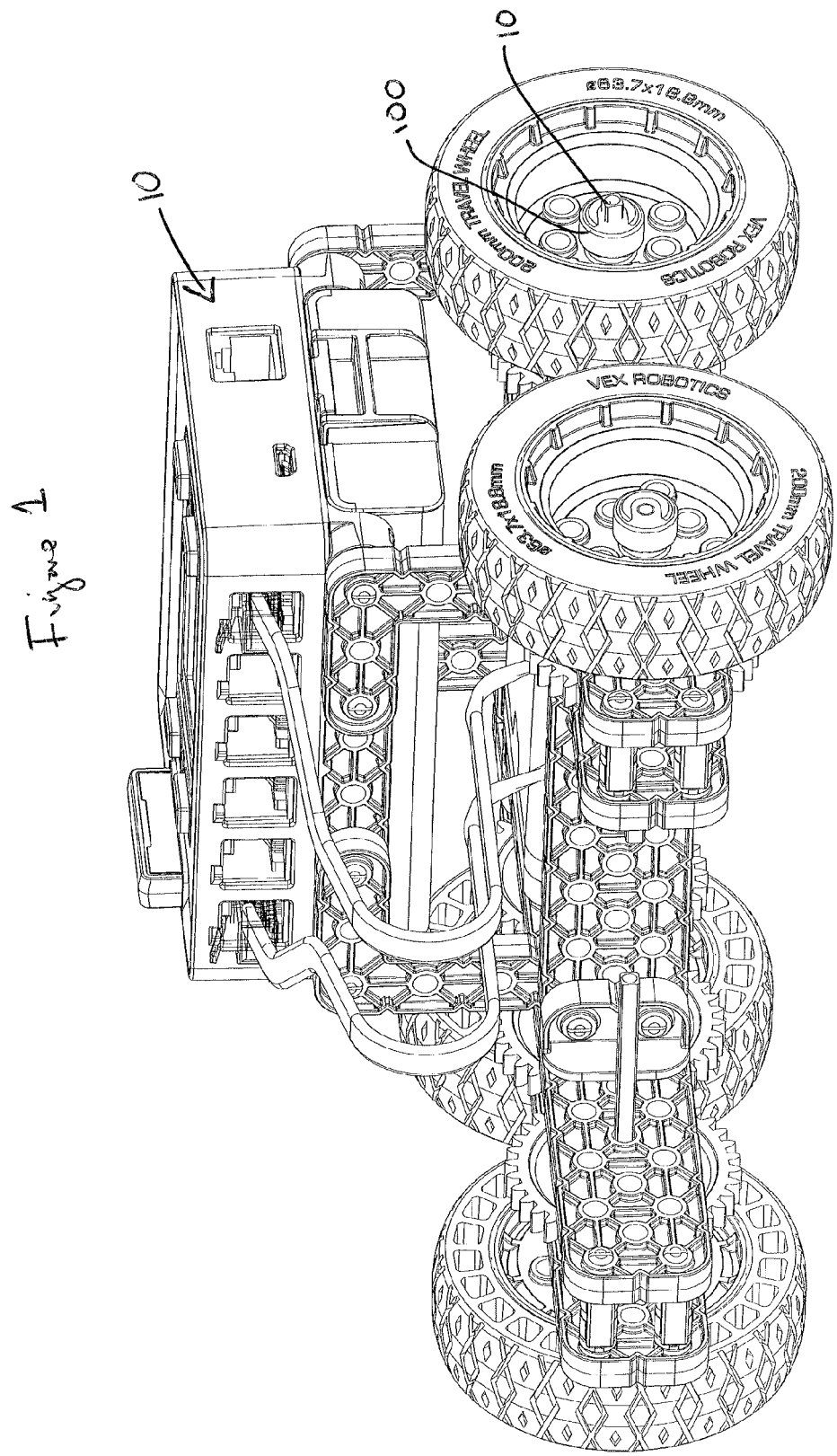
FIG. 1 is a mechanical toy incorporating one or more shaft collars designed in accordance with an embodiment of the present invention.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Figure 2:
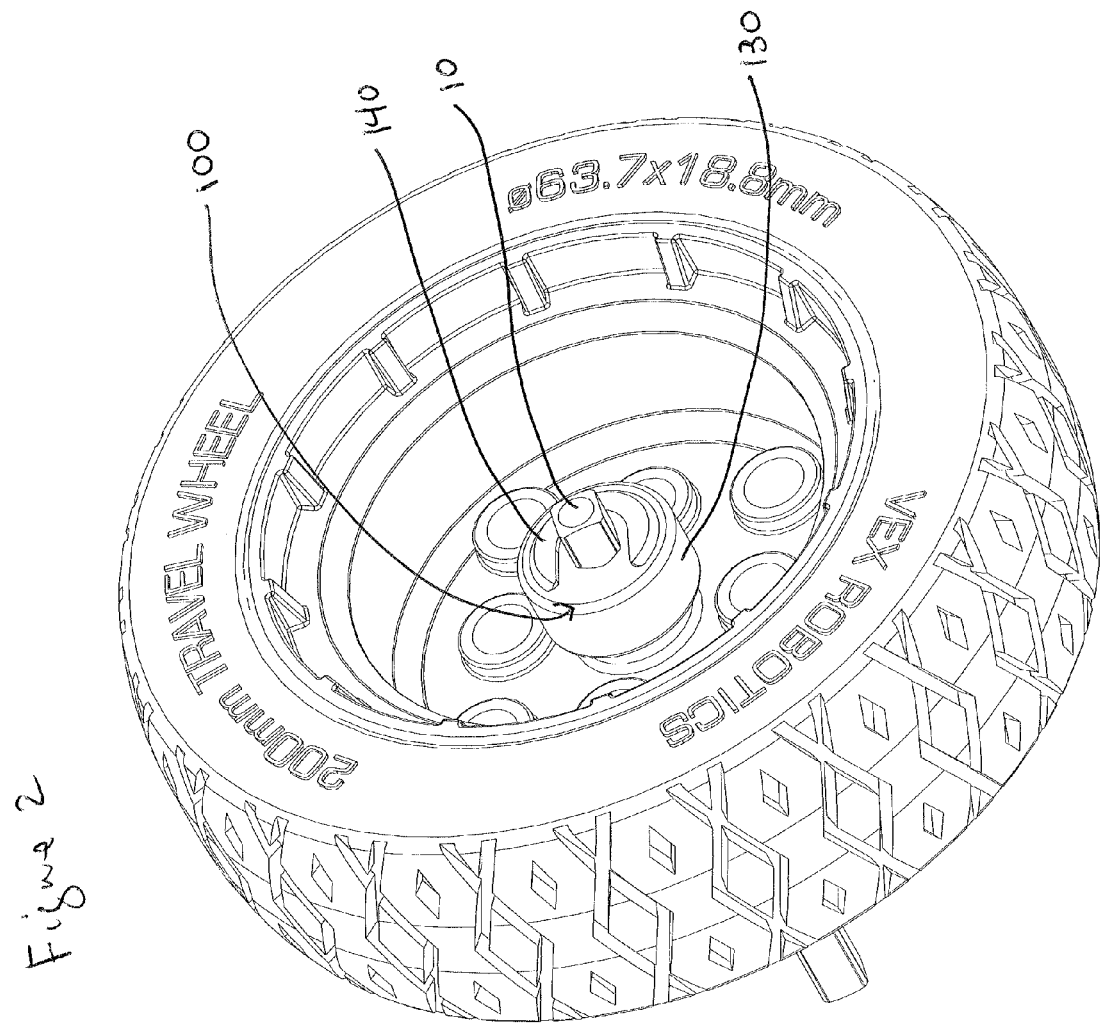
FIG. 2 is a perspective view of a tire with a shaft and shaft collar designed in accordance with an embodiment of the present invention.
Figure 5B:
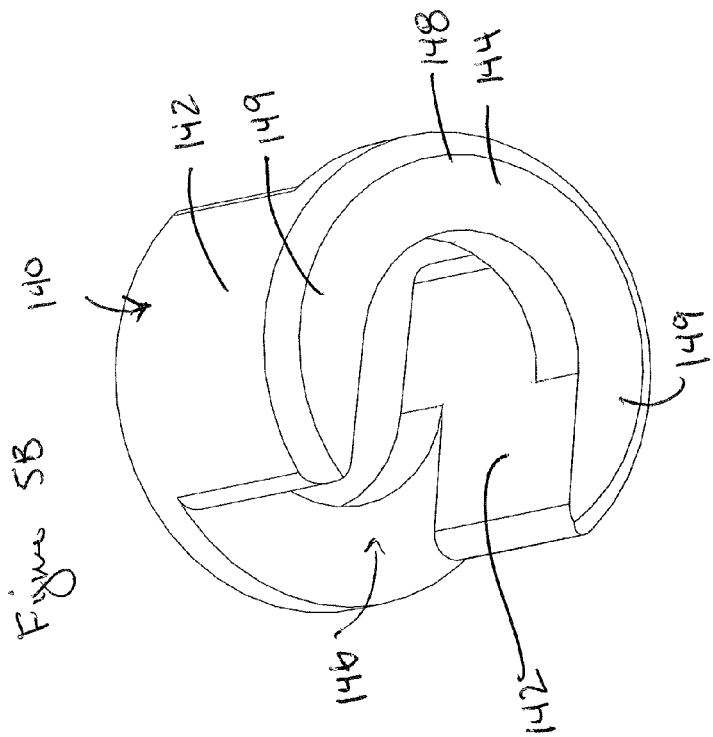
FIGS. 5A and 5B are perspective views of the reinforcement component of the two piece component shaft collar designed in accordance with an embodiment of the present invention.
Figure 5A:
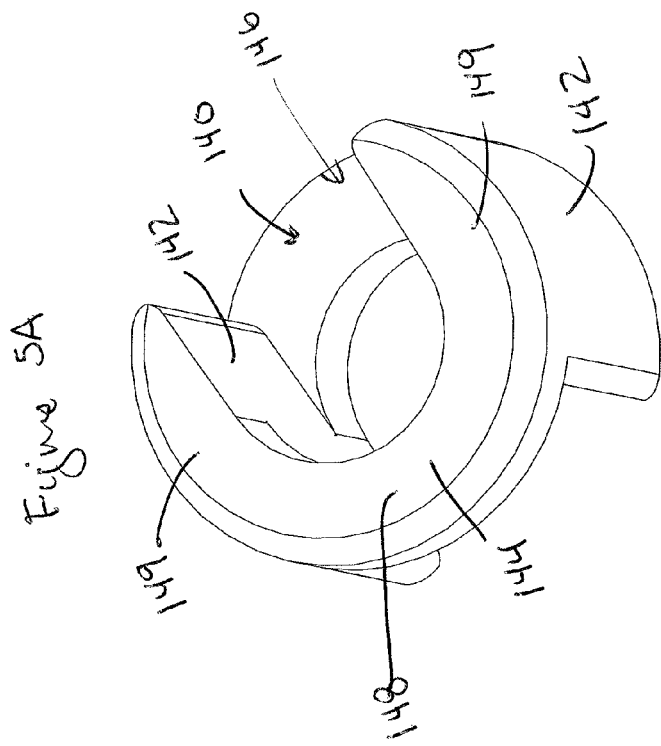

Referring now to FIG. 1, there is shown a mechanical toy 10 that is created from assembling various component parts. The component parts include various pieces that fit together and that may include a gear train and drive shaft that is operable for rotation or movement by a motor. All of the component parts may be assembled without the need for tools and thus may be assembled by a child. In order to ensure that certain pieces are spaced properly or secured on an drive shaft or axle, referred to herein generally as a shaft 10 (as shown in FIG. 2) the use of a shaft collar 100 in accordance with an embodiment of the present invention is provided.

Referring to FIGS. 3-5B, the shaft collar 100 has a two component structure 120 defined by a first component 130 having a central bore 110 for receipt of a shaft or axle. The first component 130 is preferably made from a resilient elastomeric material that is permitted to stretch to allow the shaft or axle to slide through the central bore, but does include a relative stiffness such that it is capable of gripping onto the axle or shaft to prevent longitudinal movement of the shaft collar 100 in use. Most rubbers could be used as the resilient elastomeric material.

When originally designing the shaft collar 100 it was found that just a simple resilient elastomeric shaft collar was problematic especially when the collar was positioned against a plastic component. The friction between a resilient elastomeric collar and plastic component could cause an excess generation of heat and wear on the resilient elastomeric collar. Plastic shaft collars were also contemplated but while plastic against plastic rotational movement reduced friction and heat, a plastic shaft collar was too stiff to ensure an easy placement by a child. As such, the shaft collar 100 includes a second component 140.

The second component 140 is positioned within or about the first component 130. The second component 140 includes a pair of opposing ribs 142 positioned within the first component and about the central bore 110. Connected on the upper and lower ends of the ribs 142 are C-shaped caps 144 that protrude from the upper and lower faces 132 and 134 of the first component 130. In addition, the C-shaped caps 144 are positioned such that one open end 146 from one of the caps 144 faces the other open end 146. The second component 140 is preferably made from a plastic.

In one aspect the ribs are arcuate shaped to better accommodate for or surround the center bore 110. In addition, closed ends 148 of the C-shaped caps may be positioned such that the ribs 142 are only positioned over the legs 149 of the C-shaped caps. In one embodiment the two component shaft collar is co-molded.

Having a base first component 130 of a resilient elastomeric with a second component of plastic 140 with caps protruding from the first component allows the plastic caps to be positioned against other plastic components and as rotating the plastic against plastic rotation exhibits less friction and heat. In addition, having the resilient elastomeric material surround the ribs and be positioned between the C-shaped caps provides a radial flexibility in the shaft collar allowing a child to easily slide the shaft collar on and off a shaft or axle. In one embodiment a shaft collar was provided in accordance with the above mentioned components that was slid onto a shaft with a 800-900 grams of pushing force.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

We claim:

1. A shaft collar comprising:
    a two component structure defined by a first component having a central bore for receipt of a shaft or axle and a second component positioned partially within the first component, and the second component having a higher stiffness than the first component, and
    the second component including a pair of opposing ribs positioned within the first component and about the central bore, a pair of C-shaped caps separately positioned against upper and lower ends of the pair of ribs and wherein the pair of opposing ribs have a height such that the at least a portion of the pair of C-shaped caps protrude from the upper and lower faces of the first component.

2. The collar of claim 1, wherein the first component is made from a resilient elastomeric material and the second component is made from a plastic material.

3. The collar of claim 1, wherein the C-shaped caps are orientated such that one open end from one of the caps faces the open end of the other cap.

4. The collar of claim 1, wherein the ribs are arcuate shaped.

5. The collar of claim 1, wherein the C-shaped caps are orientated such that the ribs are positioned over legs of the C-shaped caps.

6. The collar of claim 1, wherein the shaft collar is formed by co-molding the two components.

7. A mechanical toy having a shaft and an improved shaft collar, and wherein the improved shaft collar includes a two component structure defined by a first component having a central bore for receipt of a shaft or axle and a second component positioned partially within the first component, and the second component having a relatively higher stiffness than the first component, and the second component including a pair of opposing ribs positioned within the first component and about the central bore, a pair of C-shaped caps separately positioned against upper and lower ends of the pair of ribs and wherein the pair of opposing ribs have a height such that the at least a portion of the pair of C-shaped caps protrude from the upper and lower faces of the first component.

8. The collar of claim 7, wherein the first component is made from a resilient elastomeric material and the second component is made from a plastic material.

9. The collar of claim 7, wherein the C-shaped caps are orientated such that one open end from one of the caps faces the open end of the other cap.

10. The collar of claim 7, wherein the ribs are arcuate shaped.

11. The collar of claim 7, wherein the C-shaped caps are orientated such that the ribs are positioned over legs of the C-shaped caps.

12. A shaft collar comprising:
    a two component structure defined by a first component having (i) upper and lower faces and (ii) a central bore extending through the first component and aligned with the upper and lower faces, the central bore configured to receive a shaft or axle; and the two component structure further defined by a second component having a first portion positioned at least partially within the first component wherein the second component further includes a pair of opposing ribs positioned within the first component and about the central bore, a pair of C-shaped caps separately positioned against upper and lower ends of the pair of ribs and wherein the pair of opposing ribs have a height such that the at least a portion of the pair of C-shaped caps protrude from the upper and lower faces of the first component.

13. The shaft collar of claim 12, wherein the second component further includes a second portion protruding from at least one of the upper or lower faces of the first component, the second portion configured to assist in maintaining a compression on a shaft or axle inserted through the central bore by limiting deflection of the first component around at least a portion of the central bore.

14. The shaft collar of claim 12, wherein the second component further includes portions protruding from both the upper or lower faces of the first component.

15. The shaft collar of claim 12, wherein the second component has a higher stiffness than the first component.

16. The collar of claim 12, wherein the first component is made from a resilient elastomeric material and the second component is made from a plastic material.

17. The collar of claim 12, wherein the C-shaped caps are orientated such that one open end from one of the caps faces the open end of the other cap.

18. The collar of claim 12, wherein the ribs are arcuate shaped.

19. The collar of claim 12, wherein the C-shaped caps are orientated such that the ribs are positioned over legs of the C-shaped caps.

20. The collar of claim 12, wherein the shaft collar is formed by co-molding the two components.

21. A mechanical toy having a shaft and an improved shaft collar, and wherein the improved shaft collar includes:
    a two component structure defined by a first component having (i) upper and lower faces and (ii) a central bore extending through the first component and aligned with the upper and lower faces, the central bore configured to receive a shaft or axle; and the two component structure further defined by a second component having a first portion positioned at least partially within the first component wherein the second component further includes a pair of ribs positioned within the first component and about the central bore, a pair of C-shaped caps separately positioned against upper and lower ends of the pair of ribs and wherein the pair of opposing ribs have a height such that the at least a portion of the pair of C-shaped caps protrude from the upper and lower faces of the first component.

22. The shaft collar of claim 21, wherein the second component further includes a second portion protruding from at least one of the upper or lower faces of the first component.

23. The shaft collar of claim 21, wherein the second component further includes portions protruding from both the upper or lower faces of the first component.

24. The shaft collar of claim 21, wherein the second component has a higher stiffness than the first component.

25. The collar of claim 21, wherein the first component is made from a resilient elastomeric material and the second component is made from a plastic material.

26. The collar of claim 21, wherein the C-shaped caps are orientated such that one open end from one of the caps faces the open end of the other cap.

27. The collar of claim 21, wherein the ribs are arcuate shaped.

28. The collar of claim 21, wherein the C-shaped caps are orientated such that the ribs are positioned over legs of the C-shaped caps.

* * * * *